United States Patent
Jardon

(10) Patent No.: US 11,425,638 B2
(45) Date of Patent: *Aug. 23, 2022

(54) VOLTE ROAMING USING GENERAL PURPOSE PACKET DATA ACCESS

(71) Applicant: AT&T Intellectual Property I, L.P., Atlanta, GA (US)

(72) Inventor: Mario Manuel Jardon, Pembroke Pines, FL (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 242 days.

This patent is subject to a terminal disclaimer.

(21) Appl. No.: 16/872,250

(22) Filed: May 11, 2020

(65) Prior Publication Data
US 2020/0275362 A1 Aug. 27, 2020

Related U.S. Application Data

(63) Continuation of application No. 16/281,534, filed on Feb. 21, 2019, now Pat. No. 10,694,457.

(51) Int. Cl.
*H04W 4/00* (2018.01)
*H04W 48/18* (2009.01)
(Continued)

(52) U.S. Cl.
CPC .......... *H04W 48/18* (2013.01); *H04M 7/006* (2013.01); *H04W 8/183* (2013.01); *H04W 8/245* (2013.01);
(Continued)

(58) Field of Classification Search
CPC ... H04W 48/18; H04W 12/001; H04W 8/183; H04W 12/03; H04W 8/245; H04W 8/26; H04W 48/10; H04W 88/16; H04M 7/006
See application file for complete search history.

(56) References Cited

U.S. PATENT DOCUMENTS 9,313,648 B2 4/2016 Malhotra et al.
9,369,569 B1 6/2016 Lam et al.
(Continued)

FOREIGN PATENT DOCUMENTS

CN 105916131 A 8/2016
WO 2017054190 A1 4/2017
(Continued)

OTHER PUBLICATIONS

Tanaka, Itsuma. "VoLTE Roaming and Interconnection Standard Technology." NTT Docomo Technical Journal 15.2 (2013): 37-41. 5 pages. https://www.nttdocomo.co.jp/english/binary/pdf/corporate/technology/rd/technicaljournal/bn/vol15_2/vol15_2_037en.pdf.

(Continued)

*Primary Examiner* — Justin Y Lee
(74) *Attorney, Agent, or Firm* — Amin, Turocy & Watson, LLP

(57) ABSTRACT

A user equipment (e.g., mobile device) can determine whether a first mobile code stored on the user equipment matches a second mobile code received from a mobile network to which the user equipment is connected. In response to a determination indicating that the first mobile code and the second mobile code match, the user equipment can activate a Wi-Fi calling module on the user equipment to connect to an evolved packet data gateway device in the mobile network that is used for routing voice over internet protocol packets. In response to a dialed number being determined not to relate to an emergency call, the user equipment can initiate the call via a Wi-Fi calling module, and transmit a voice over internet protocol packet related to the call via a cellular data connection to the evolved packet data gateway device.

20 Claims, 12 Drawing Sheets

(51) Int. Cl.
  H04W 8/18    (2009.01)
  H04W 48/10   (2009.01)
  H04M 7/00    (2006.01)
  H04W 8/26    (2009.01)
  H04W 88/16   (2009.01)
  H04W 8/24    (2009.01)
  H04W 12/03   (2021.01)

(52) U.S. Cl.
  CPC ............ *H04W 8/26* (2013.01); *H04W 12/03* (2021.01); *H04W 48/10* (2013.01); *H04W 88/16* (2013.01)

(56) References Cited

U.S. PATENT DOCUMENTS

| | | |
|---|---|---|
| 9,456,290 B2 | 9/2016 | Aksu et al. |
| 9,654,964 B1 | 5/2017 | Carames et al. |
| 9,860,766 B1 | 1/2018 | Pawar et al. |
| 9,867,098 B2 | 1/2018 | Kwok et al. |
| 9,888,515 B2 | 2/2018 | Chaugule et al. |
| 9,924,344 B1 | 3/2018 | Datar |
| 9,942,803 B2 | 4/2018 | Ng et al. |
| 9,961,526 B2 | 5/2018 | Li et al. |
| 10,051,644 B2 | 8/2018 | Kwok et al. |
| 10,694,457 B1 * | 6/2020 | Jardon .................. H04W 48/10 |
| 2013/0181834 A1 | 7/2013 | Bentley et al. |
| 2015/0350983 A1 | 12/2015 | Kwok et al. |
| 2015/0381695 A1 | 12/2015 | Mulcahy et al. |
| 2016/0014127 A1 | 1/2016 | Mohebbi |
| 2016/0323178 A1 | 11/2016 | Hammer et al. |
| 2017/0064544 A1 | 3/2017 | Youn et al. |
| 2017/0339552 A1 | 11/2017 | Xu |
| 2018/0007587 A1 | 1/2018 | Feldman et al. |
| 2018/0049275 A1 | 2/2018 | Agarwal et al. |
| 2018/0191786 A1 | 7/2018 | Kunz et al. |
| 2018/0206153 A1 | 7/2018 | Qu et al. |
| 2018/0227750 A1 | 8/2018 | Gustafsson et al. |
| 2018/0255447 A1 | 9/2018 | Chong et al. |
| 2019/0141521 A1 | 5/2019 | Abe et al. |

FOREIGN PATENT DOCUMENTS

| | | |
|---|---|---|
| WO | 2017157441 A1 | 9/2017 |
| WO | 2018013537 A1 | 1/2018 |
| WO | 2018133949 A1 | 7/2018 |

OTHER PUBLICATIONS

Chalakkal, Sreepriya. "Practical Attacks on VoLTE and VoWIFI." ERNW Enno Rey Netzwerke, Tech. Rep (2017). 26 pages. https://pdfs.semanticscholar.org/1a7d/fe38b5782217e12011a290798113c2ad3597.pdf.

Kaltsas, Ioannis. "Make yourself at home: A comparative study of VoLTE Roaming architectures." KTH Royal Institute of Technology School of Information and Communication Technology (ICT) (2017). 69 pages. http://www.diva-portal.org/smash/get/diva2:1068217/FULLTEXT01.pdf.

Nowoswiat, David. "Take full advantage of LTE with VoWi-Fi." Nokia, nokia.com, Dec. 4, 2018. 6 pages. https://web.archive.org/web/20181204051700/https://www.nokia.com/blog/take-full-advantage-lte-vowi-fi/.

Office Action dated Sep. 3, 2019 for U.S. Appl. No. 16/281,534, 27 pages.

* cited by examiner

VOLTE ROAMING USING GENERAL PURPOSE PACKET DATA ACCESS

RELATED APPLICATION

The subject patent application is a continuation of, and claims priority to, U.S. patent application Ser. No. 16/281,534 (now U.S. Pat. No. 10,694,457), filed Feb. 21, 2019, and entitled "VOLTE ROAMING USING GENERAL PURPOSE PACKET DATA ACCESS," the entirety of which application is hereby incorporated by reference herein.

TECHNICAL FIELD

The present application relates generally to the field of wireless communication and, more specifically, to transmission of voice over internet protocol packets over a cellular data connection.

BACKGROUND

Cellular communications technology, including radio access technology, has grown rapidly and evolved since the launch of analog cellular systems in the 1980s, starting from the First Generation (1G) in 1980s, Second Generation (2G) in 1990s, Third Generation (3G) in 2000s, and Fourth Generation (4G) in 2010s (including Long Term Evolution (LTE) and variants of LTE).

Internet Protocol Security (IPsec) is a protocol suite for secure Internet Protocol (IP) communications that authenticates and encrypts each IP packet of a communication session, and can include integrity protection as well as confidentiality protection. Voice over LTE (VoLTE) service employs the use of IPsec confidentiality protection on the SIP signaling between the user equipment (UE) (e.g., smartphone) and a mobile provider's (e.g., AT&T's) IP Multimedia Subsystem, also known as IP Multimedia Core Network Subsystem (IMS) Core. The IMS core is an architectural framework for delivering IP multimedia services, and includes an S8 home-routed (S8HR) architecture for VoLTE roaming, which was introduced in 2017. In the S8HR architecture, which is a recognized architecture for VoLTE Roaming by Groupe Spéciale Mobile Association (GSMA) and is used in many parts of the world, the P-CSCF is in the home network of the wireless user (e.g., the user's user equipment). In the case of an international roaming UE that uses S8HR to make and receive VoLTE calls, the session initiated protocol (SIP) message is encrypted from the UE in country "X" to the P-CSCF in the United States. An attempt to perform a lawful intercept by governmental agencies in country X would fail to provide the call details in the SIP messages because the SIP messages would be encrypted everywhere across the visited LTE network in country X.

However, this encryption violates legal requirements in certain countries where the government demands that lawful interception of cellular voice be provided without encryption, such that the government would be able to access details of the message. The solution currently documented in 3GPP standards requires the home network provider to disable IPSec Confidentiality Protection when a customer is using VoLTE service with the S8HR roaming architecture. This allows the visited LTE network provider to intercept the SIP messages in clear text form and provide the call details to its Government agencies. The problem is that this 3GPP solution exposes AT&T and its VoLTE roamers to security and fraud risks when they are outside of the United States. It also puts the VoLTE service at a disadvantage to "Over-the-Top" (OTT) voice over IP (VoIP) applications that are free to use IPsec or other methods that provide security to callers.

The above-described background relating to wireless networks is merely intended to provide a contextual overview of some current issues and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
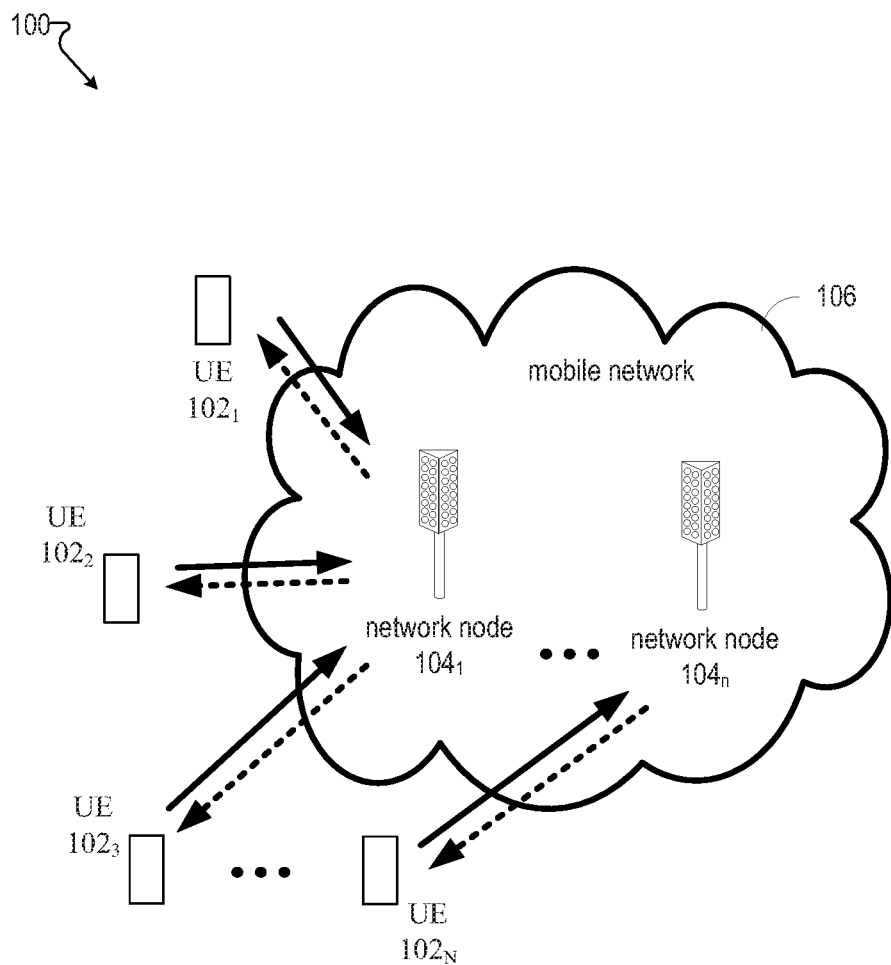
FIG. 1 illustrates an example wireless communication system having a network node device (also referred to herein as a network node) and user equipment (UE), in accordance with various aspects and example embodiments of the subject disclosure.

The subject disclosure is now described with reference to the drawings, wherein like reference numerals are used to refer to like elements throughout. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the provided drawings. In the following description, for purposes of explanation, numerous specific details are set forth in order to provide a more thorough understanding of the subject disclosure. It may be evident, however, that the subject disclosure can be practiced without these specific details. In other instances, structures and devices are shown in block diagram form to facilitate describing the subject disclosure.

The methods and operations (e.g., processes and logic flows) described in this specification can be performed by devices (e.g., network management device, gateway device, etc.) comprising programmable processors that execute machine executable instructions (e.g., computer program product, computer-readable instructions, software, software programs, software applications, software modules, etc.) to facilitate performance of the operations described herein.

The present application relates to the implementation of a hybrid between VoLTE and Wi-Fi Calling. Typically, over-the-top (OTT) VoIP applications (e.g., as offered by Skype, Google Voice) rely on the Internet to deliver packets on a "best effort" basis (e.g., no quality of service (QoS) associated with the best effort traffic). VoLTE, on the other hand, uses the IMS (and new radio (NR) in the case of 5G) access network features to ensure low latency, improved error correction in fringe areas, and other features that maintain a guaranteed level of voice (e.g., maintains a QoS). In example embodiments, a user equipment (UE) that supports both VoLTE and Wi-Fi calling comprises a module that enables the UE to receive an MCC (mobile country code) in the public land mobile network (PLMN) identification (ID) being obtained from an LTE broadcast channel of a visited network prior to initiating an IMS access point name (APN) connection with the packet core of a mobile system. In example embodiments, the UE (or subscriber identification module (SIM) card inserted into the UE) can be pre-provisioned to contain a table of MCC values for countries where S8HR VoLTE roaming with IPsec confidentiality protection enabled is not allowed, or where VoLTE roaming is not allowed. If the UE checks the broadcast MCC (e.g., signal being broadcast to the UE contains a country identifier) and it matches an MCC code value in the table entry, the UE can be operable to not initiate a VoLTE call, e.g., initiate an IMS APN session creation request to the Packet Core. Instead the UE would leverage the Wi-Fi calling client to establish connectivity to the IMS core via the Internet. The device would use the general-purpose LTE data APN to access the Internet. With internet access it could reach the evolved packet data gateway (ePDG) used for routing Wi-Fi calls to the IMS core, and follow the standard flow for Wi-Fi calling after that. It would resemble a Wi-Fi calling customer in almost every way, except that the UE would be using LTE data versus Wi-Fi to reach the IMS core. By using this approach, the legal requirements would not apply since the UE would be making VoIP calls over the Internet in much the same way as any OTT VoIP application. The visited network would not be providing standard VoLTE IMS QoS or IMS APN access. It would just be providing LTE packet data service for AT&T roamers. In other words, the voice service being used would not meet the 3GPP and GSMA standard definition of VoLTE and would not need fall under the same restrictions.

In addition to enabling a secure form of communication that does not violate a foreign country's laws, the example embodiments of the present application also address the hundreds of instances in which mobile operators that have LTE roaming agreements with an LTE partner network, but do not have an IMS or VoLTE roaming agreement with the partner. In these situations, if a user makes a phone call while using the partner LTE network, the UE would be forced to use a 3G network to complete the call. Additionally, there are roaming partners that have only an LTE agreement, but do not have 3G. If these partners do not have 3G roaming, and also do not have a VoLTE roaming agreement, then smart phones cannot make calls with that partner; having a UE that is enabled to use a cellular LTE data to carry VoIP traffic initiated by the Wi-Fi calling client of the UE to reach the IMS core would also address this situation. As such, in accordance with the present application, if the UE checks the broadcast mobile network code MNC (e.g., signal being broadcast to the UE that identifies the mobile network) and it matches an MNC code value in the table entry, the UE can likewise leverage the Wi-Fi calling client to establish connectivity to the IMS core via the Internet.

FIG. 1 illustrates some example components of a typical wireless communication system 100 (also referred to as wireless system 100, mobile system 100, mobile communications system 100). In example embodiments (also referred to as non-limiting embodiments), wireless communications system 100 can comprise a mobile (also referred to as cellular) network 106, which can comprise one or more mobile networks typically operated by communication service providers. The wireless communication system 100 can also comprise one or more user equipment (UE) 102$_{1-N}$ (also referred to as UE 102). UE 102$_{1-N}$ can communicate with one another via one or more network node devices (also referred to as network nodes) 104$_{1-N}$ (referred to as network node 104 in the singular) of the mobile network 106. The dashed arrow lines from the network nodes 104$_{1-N}$ to the UE 102$_{1-N}$ represent downlink (DL) communications and the solid arrow lines from the UE 102$_{1-N}$ to the network nodes 104$_{1-N}$ represent uplink (UL) communications.

UE 102 can comprise, for example, any type of device that can communicate with mobile network 106, as well as other networks (see below). The UE 102 can have one or more antenna panels having vertical and horizontal elements. Examples of a UE 102 comprise a target device, device to device (D2D) UE, machine type UE, or UE capable of machine to machine (M2M) communications, personal digital assistant (PDA), tablet, mobile terminal, smart phone, laptop mounted equipment (LME), universal serial bus (USB) dongles enabled for mobile communications, a computer having mobile capabilities, a mobile device such as cellular phone, a dual mode mobile handset, a laptop having laptop embedded equipment (LEE, such as a mobile broadband adapter), a tablet computer having a mobile broadband adapter, a wearable device, a virtual reality (VR) device, a heads-up display (HUD) device, a machine-type communication (MTC) device, internet of things (IoT) device, cellular to vehicle everything (C-V2X) device, and the like.

Mobile network 106 can include various types of disparate networks implementing various transmission protocols, including but not limited to cellular networks, femto networks, picocell networks, microcell networks, internet protocol (IP) networks, and the like. For example, in at least one implementation, wireless communications system 100 can be or can include a large-scale wireless communication network that spans various geographic areas, and comprise various additional devices and components (e.g., additional network devices, additional UEs, network server devices, etc.).

Still referring to FIG. 1, mobile network 106 can employ various cellular systems, technologies, and modulation schemes to facilitate wireless radio communications between devices (e.g., the UE 102 and the network node 104). While example embodiments might be described for 5G New Radio (NR) systems, the embodiments can be applicable to any radio access technology (RAT) or multi-RAT system where the UE operates using multiple carriers. For example, wireless communications system 100 can be of any variety, and operate in accordance with standards, protocols (also referred to as schemes), and network architectures, including but not limited to: global system for mobile communications (GSM), 3GSM, GSM Enhanced Data Rates for Global Evolution (GSM EDGE) radio access network (GERAN), Universal Mobile Telecommunications Service (UMTS), General Packet Radio Service (GPRS), Evolution-Data Optimized (EV-DO), Digital Enhanced Cordless Telecommunications (DECT), Digital AMPS (IS-136/TDMA), Integrated Digital Enhanced Network (iDEN), Long Term Evolution (LTE), LTE Frequency Division Duplexing (LTE FDD), LTE time division duplexing (LTE TDD), Time Division LTE (TD-LTE), LTE Advanced (LTE-A), Time Division LTE Advanced (TD-LTE-A), Advanced eXtended Global Platform (AXGP), High Speed Packet Access (HSPA), Code Division Multiple Access (CDMA), Wideband CDMA (WCMDA), CDMA2000, Time Division Multiple Access (TDMA), Frequency Division Multiple Access (FDMA), Multi-carrier Code Division Multiple Access (MC-CDMA), Single-carrier Code Division Multiple Access (SC-CDMA), Single-carrier FDMA (SC-FDMA), Orthogonal Frequency Division Multiplexing (OFDM), Discrete Fourier Transform Spread OFDM (DFT-spread OFDM), Single Carrier FDMA (SC-FDMA), Filter Bank Based Multi-carrier (FBMC), zero tail DFT-spread-OFDM (ZT DFT-s-OFDM), Unique Word OFDM (UW-OFDM), Unique Word DFT-spread OFDM (UW DFT-Spread-OFDM), Cyclic Prefix OFDM (CP-OFDM), resource-block-filtered OFDM, Generalized Frequency Division Multiplexing (GFDM), Fixed-mobile Convergence (FMC), Universal Fixed-mobile Convergence (UFMC), Multi Radio Bearers (RAB), Wi-Fi, Worldwide Interoperability for Microwave Access (WiMax), and the like.

Still referring to FIG. 1, in example embodiments, UE 102 can be communicatively coupled (or in other words, connected) to a network node 104 of the mobile network 106. Network node 104 can have a cabinet and other protected enclosures, an antenna mast, and multiple antennas for performing various transmission operations (e.g., MIMO operations). Each network node 104 can serve several cells, also called sectors, depending on the configuration and type of antenna. Network node 104 can comprise NodeB devices, base station (BS) devices, mobile stations, access point (AP) devices, and radio access network (RAN) devices. Network node 104 can also include multi-standard radio (MSR) radio node devices, including but not limited to: an MSR BS, an eNode B device (e.g., evolved NodeB), a network controller, a radio network controller (RNC), a base station controller (BSC), a relay device, a base transceiver station (BTS), an access point, a transmission point (TP), a transmission/receive point (TRP), a transmission node, a remote radio unit (RRU), a remote radio head (RRH), nodes in distributed antenna system (DAS), and the like. In 5G terminology, the network node is referred to by some as a gNodeB (gNB) device, which provides NR user plane and control plane protocol terminations towards the UE, and connects to the 5G core.

Figure 2:
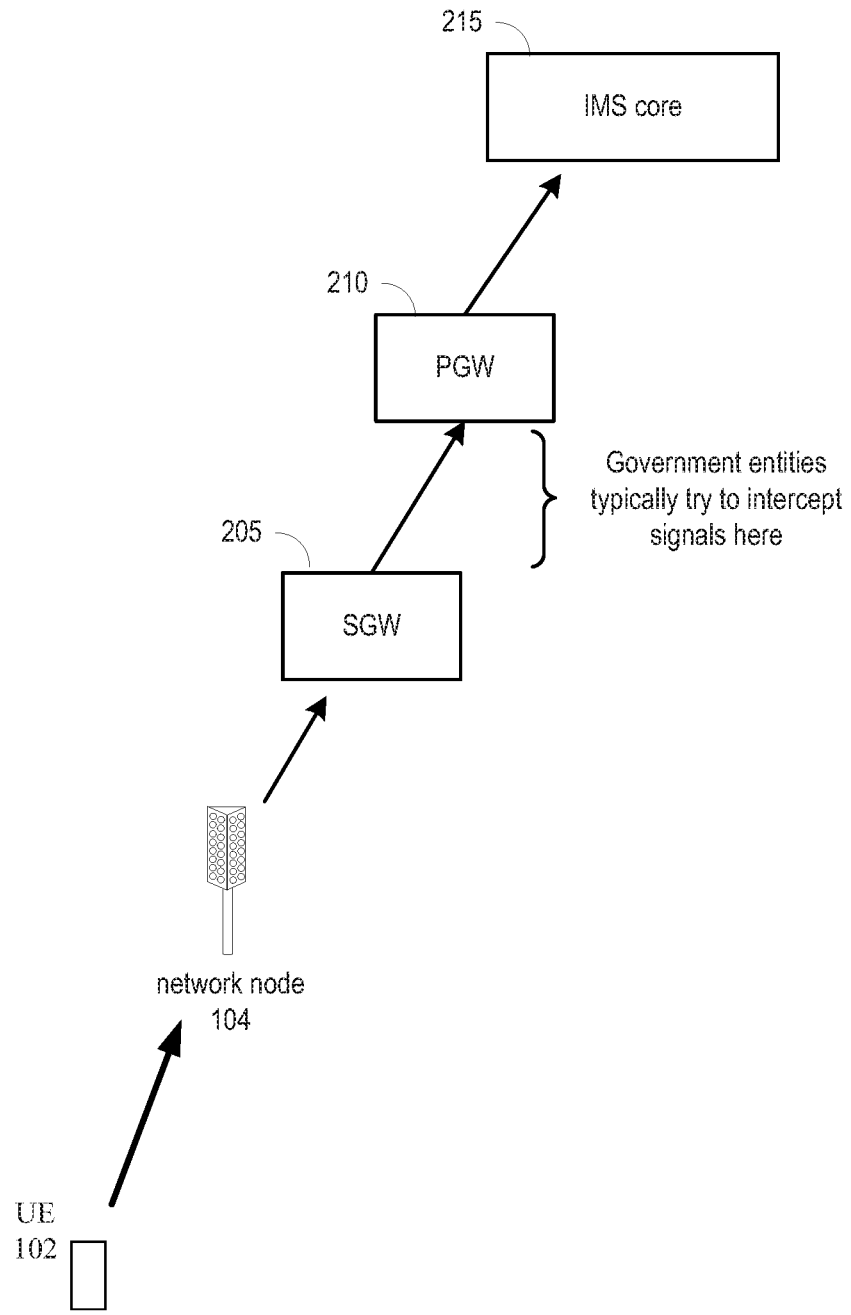
FIG. 2 illustrates an example voice over long term evolution (VoLTE) call through a mobile network, in accordance with various aspects and example embodiments of the subject disclosure.

FIG. 2, describes example components involved in the pathway of a typical VoLTE roaming call. Referring to an uplink communication, a UE 102 initiates a communication with a network node 104. The network node 104 routes VoLTE traffic packets to a serving gateway (SGW) (SGW 205), which in turn routes the traffic, using an IMS APN, to a packet data network gateway (PGW) (PGW 310). From the PGW, the packets are routed to the IMS core (IMS core 215, and more specifically to a proxy Call Session Control Function (P-CSCF) component (e.g., device or devices implementing software) within the IMS core.

Still referring to FIG. 2, in a VoIP call in which there are no laws preventing encrypted VoLTE calls, the packets communicated from the UE to the IMS core are protected using, for example, IPSec, which as mentioned above, is a protocol suite for secure IP communications that authenticates and encrypts each IP packet of a communication session, and can include integrity protection and confidentiality protection. Voice over LTE (VoLTE) service employs the use of IPsec confidentiality protection on the SIP signaling between the UE 102 and the IMS core.

As shown in FIG. 2, government entities of some foreign countries typically attempt to intercept VoLTE transmissions between the SGW and the PGW. If the VoLTE communications are protected (e.g., by IPSec), then they will not be able to access (e.g., decrypt) these communications. As such, the governments of some of these countries have enacted laws forbidding the encryption of VoLTE communications. Such laws, although having the intent of providing transparency in communications capable of being monitored by the government, can expose these communications to other wrongdoers. Additionally, these laws do not apply to Over the Top (OTT) voice over IP (VoIP) communications, so services that use a VoIP application to enable calls (e.g., Skype) would have a security advantage over VoLTE providers.

Figure 3:
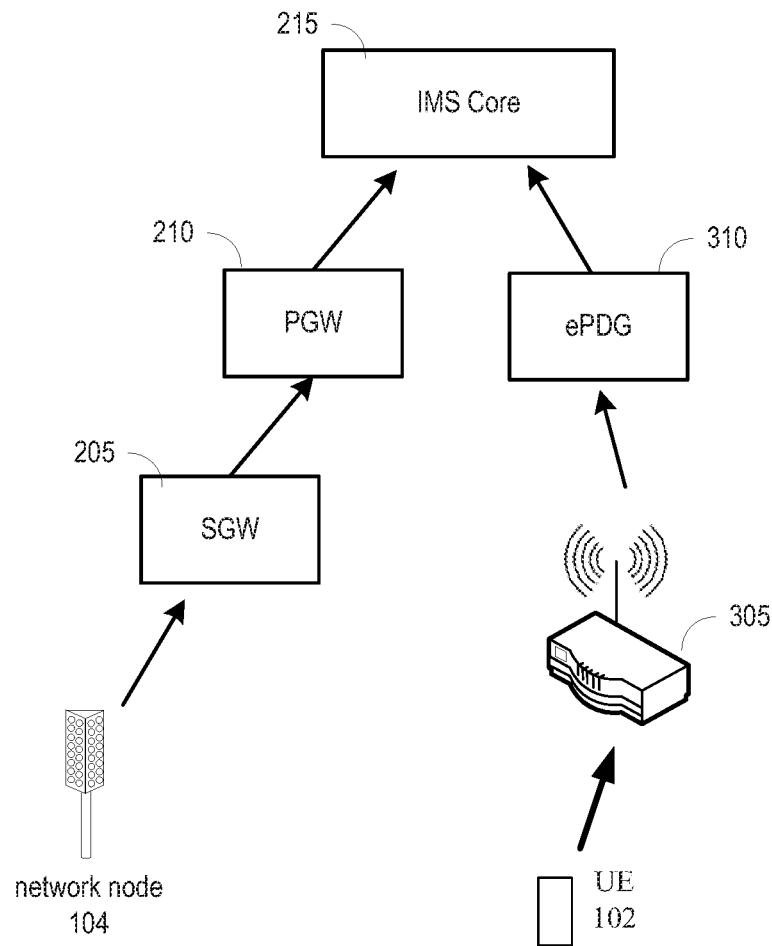
FIG. 3 illustrates an example Wi-Fi call through a Wi-Fi access point, in accordance with various aspects and example embodiments of the subject disclosure.

Moving to FIG. 3, in a typical Wi-Fi call, a UE (e.g., UE 102) instead of communicating through a mobile provider's network node (e.g., network node 104), but through a Wi-Fi access point (WAP) (e.g., WAP 305), which can comprise a Wi-Fi router connected to, for example, a fixed network such as an Asynchronous Digital Subscriber Line (ADSL) or cable broadband network (e.g., a cable broadband network that operates according to the Data Over Cable Service Interface Specification (DOCSIS) standard). With a typical Wi-Fi call, VoIP packets would be sent via a Wi-Fi access point through the internet to the evolved packet data gateway (e.g., ePDG 310), and then routed to the IMS core 215 (e.g., via a PGW IMS APN). With a Wi-Fi call, the IP packets that are transmitted contain voice, but, as mentioned above, do not have a QoS associated with them (e.g., are "best effort" traffic). If a UE has Wi-Fi calling enabled, and if the device is connected via a WAP, then the UE can make a call through the WAP. This can offload some of the traffic from a mobile network to a fixed network (e.g., ADSL, or DOCSIS network). UEs, in accordance with example embodiments herein, can be configured to make a Wi-Fi call first, before attempts to make any other call, if Wi-Fi calling is enabled on the UE.

Figure 4:
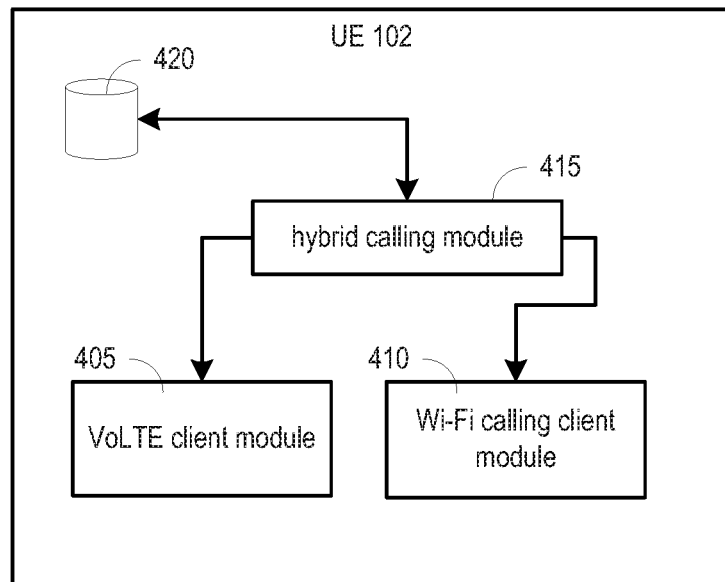
FIG. 4 illustrates a block diagram of example modules of a UE, in accordance with various aspects and example embodiments of the subject disclosure.

FIG. 4 illustrates a block diagram showing a UE 102 having a VoLTE client module 405, a Wi-Fi calling client module 410, and a hybrid calling module 415, in accordance with example embodiments of the present application. The UE 102 running the VoLTE client module 405 can make voice calls over an LTE network, as described above with respect to FIG. 2. The UE 102 running the Wi-Fi calling client module 410 can make VoIP Wi-Fi calls via a Wi-Fi access point, as described above in FIG. 3. The hybrid calling module 415 can facilitate determining when to use the Wi-Fi calling client module 410, and then facilitate using the Wi-Fi calling client module 410 to establish a connection to make VoIP calls over an LTE cellular data connection, as will be described further below.

Figure 5:
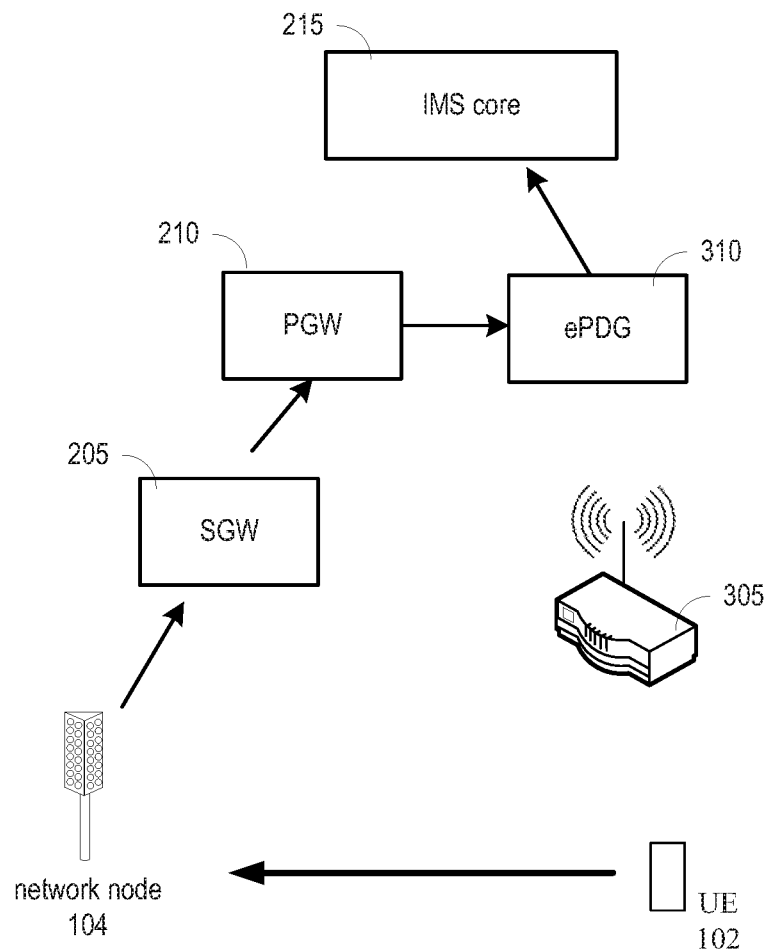
FIG. 5 illustrates an example of a VoIP call placed using a Wi-Fi calling client, in accordance with various aspects and example embodiments of the subject disclosure.

FIG. 5 shows an example embodiment of a system that uses cellular LTE data to carry VoIP traffic initiated using the Wi-Fi calling client module 410 of a UE 102 (e.g., UE 102 as shown in FIG. 4) to reach the IMS core 215, in accordance with example embodiments of the present application. In example embodiments, the UE 102 can use the hybrid calling module 415 to determine whether a mobile code (e.g., mobile country code (MCC), or mobile network code (MNC)) stored on the device (e.g., in repository, comprising, for example, a memory on the device or on a SIM card) is applicable to voice calls made from the device. The applicability of the mobile code can based upon a location of the mobile device (for example, if the broadcast mobile country code (MCC) from the mobile network matches an MCC code value in the table entry identifying the country associated with that MCC as having laws that do not allow for VoLTE encryption), or it can be based on whether the mobile network is contracted to allow VoLTE roaming calls from the UE 102 and whether the mobile network is capable of 3G roaming In response to determining that the MCC or MNC is applicable to the voice calls, the UE 102 can activate the Wi-Fi calling client module 410 to connect to a packet data gateway device in the mobile network that is used for routing of VoIP packets (e.g., as described below with respect to FIG. 5). If the call is not an emergency call (discussed further below), then the VoIP packets related to the call can be transmitted to the network node (e.g., network node 104), which can be an eNodeB in LTE terms. The network node 104 can route the VoIP packets to the SGW 205, which can then route the VoIP packets (e.g., using the LTE general data APN to get to the PGW), and from the PGW, the packets can be routed by the PGW 210 to the ePDG 310. The PGW can comprise software modules that, when executed, recognized the transmitted packets as VoIP packets, and routes the packets to the ePDG. Once the VoIP packets reach the ePDG 310, the VoIP packets proceed to the IMS core 215 in the same fashion as VoIP packets that were routed through a Wi-Fi access point 305. Thus, the call would have the appearance of a Wi-Fi call, but the call is not routed through the Wi-Fi access point 305, but instead is routed using an LTE cellular data connection.

Figure 6:
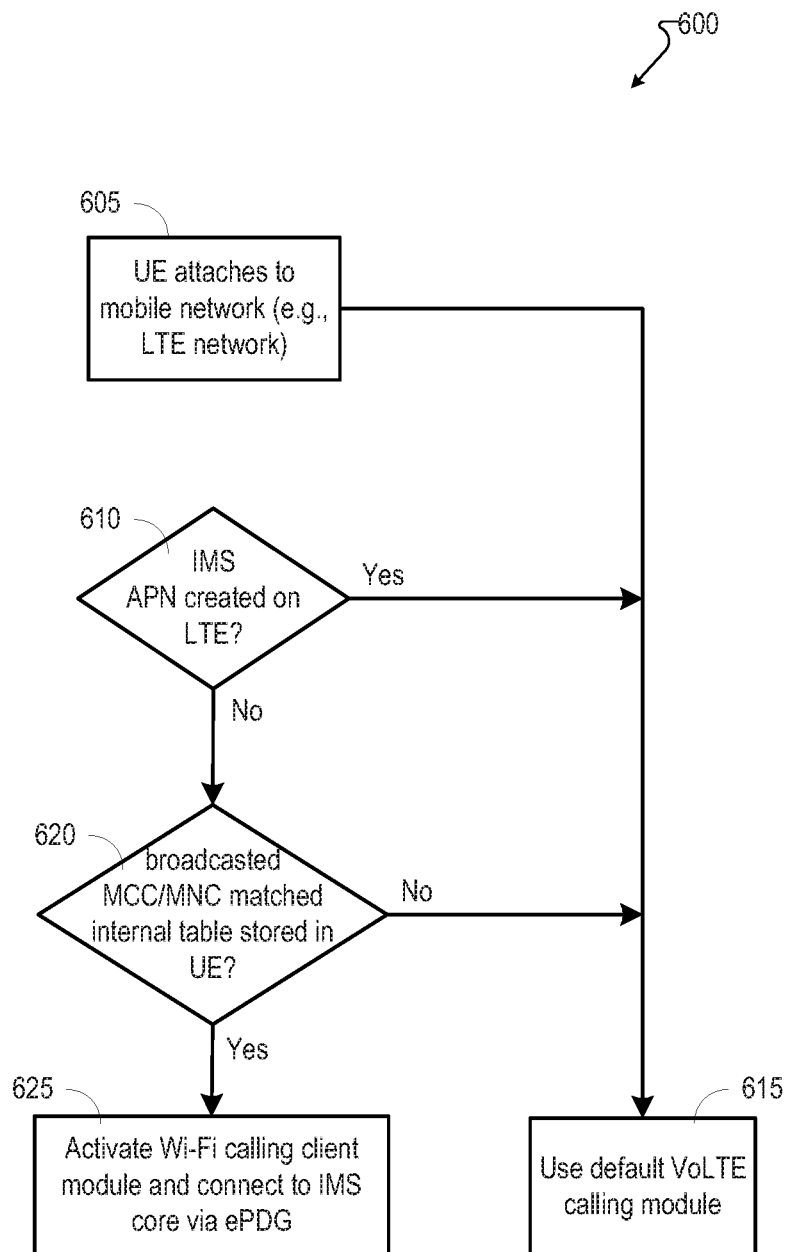
FIG. 6 illustrates example operations that can be performed by a UE for determining whether to use a Wi-Fi calling client to connect through an LTE cellular data connection, in accordance with various aspects and example embodiments of the subject disclosure.

FIG. 6 depicts a flow chart depicting example operations 600 that can be performed by the UE 102 (e.g., using the hybrid calling module 415, the VoLTE client module 405, and the Wi-Fi calling client module 410). At block 605, the UE attaches itself to the mobile network (e.g., a mobile network that might be located in another country). The UE can, at step 610, attempt to establish an IMS APN over LTE (e.g., establish an LTE cellular data connection) so that it can make a traditional VoLTE call (e.g., as described above with respect to FIG. 2). If an IMS APN is created, the call proceeds to block 615 wherein the default logic to make a VoLTE call (e.g., VoLTE client module 405) can be used. If an IMS APN is not created, then at block 620, the UE 102 can determine whether an MCC/MNC is applicable. If the broadcast MCC/MNC matches an MCC/MNC stored on the device (e.g., repository 420 in the device memory or a SIM card in the device), this would mean that the device is operating in a country requiring unencrypted calls VoLTE calls. If the MNC matches, this would mean that the mobile network partner does not have a roaming agreement with the UE's originating mobile provider, and also does not have 3G roaming In either of these circumstances, the UE can at block 625 activate its Wi-Fi calling client module 410 and connect to the IMS core 215 via ePDG 310. From here, the operations can move to FIG. 7.

Figure 7:
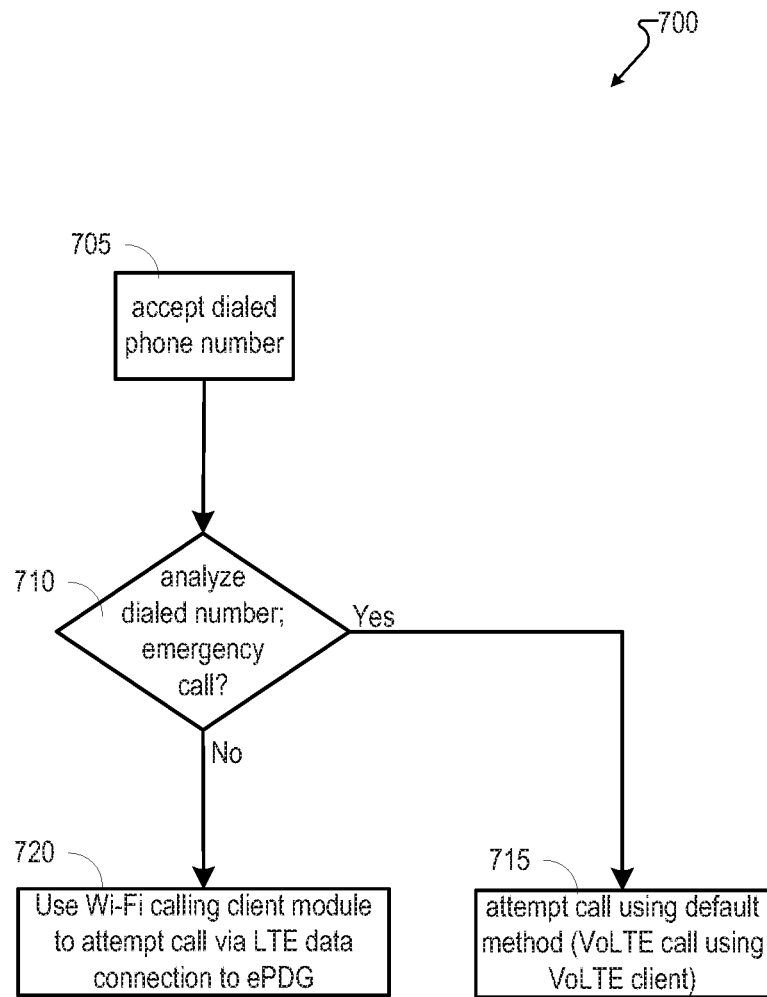
FIG. 7 illustrates example operations for placing a call based on a determination as to whether the call was an emergency call, in accordance with various aspects and example embodiments of the subject disclosure.

In FIG. 7, the UE 102 at block 705 of example operations 700 accepts a dialed phone number (dialed number associated with the party that the user of the UE 102 is trying to call) that has been input (e.g., dialed) into the UE 102. Before the UE uses the Wi-Fi calling client to make a voice call over the LTE data connection, it at block 710 analyzes the dialed number and determines whether it is an emergency number. In response to a determination that the dialed number is an emergency number, then at step 715 the UE can attempt a call using the default method (e.g., placing a call using the SOS APN (e.g., SOS being the international code signal for distress and appeal for help) and VoLTE client module 405, or Circuit-Switched routing via a Mobile Switching Center (MSC)). If the dialed number is not an emergency number, then at block 720, the UE can use the Wi-Fi calling client module 410 to attempt a call via the LTE data connection to the ePDG 310. Once the call has been placed, the UE can begin to send VoIP packets via the LTE data connection.

In each of the example operations described above, and below in FIGS. 8-10, steps, blocks, features, or aspects can be substituted or combined with other steps, blocks, features, or aspects, unless context warrants that such combinations or substitutions are not possible. Further, if a step, block, feature, or aspect is not described with respect to example operations, this does not mean that the feature, step, or aspect is incompatible or impossible with respect to those example operations. As such, the example operations of the present application described above and below are not necessarily limited to the steps, features, or aspects that are described with respect to those example operations.

Figure 8:
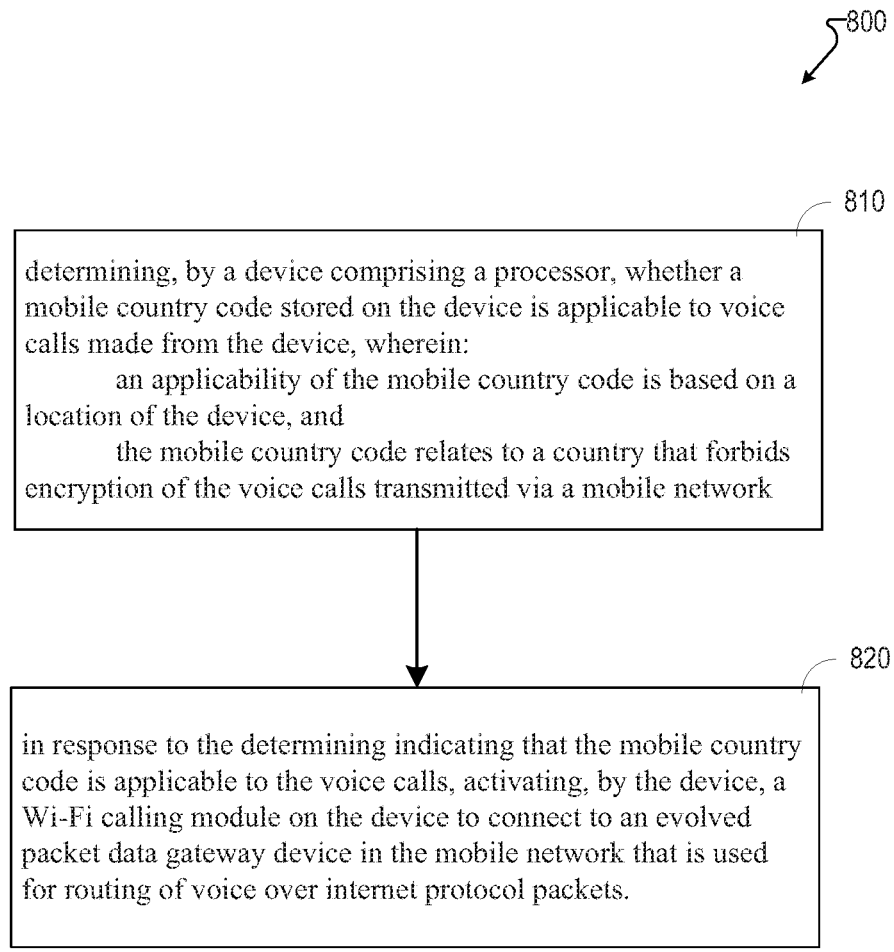
FIG. 8 illustrates example operations that can be performed by a user equipment, in accordance with various aspects and example embodiments of the subject disclosure.

FIG. 8 illustrates a flow diagram of example operations 800 that can be performed by a device (e.g., UE 102) comprising a processor and a memory that stores executable instructions that, when executed by the processor, facilitate performance of operations 800. At block 810, the example operations can comprise determining by the device, whether a mobile country code (e.g., MCC) stored on the device (e.g., in a repository 420, which can be in the device's memory, or in the SIM card's memory) is applicable to voice calls (e.g., VoLTE calls, wherein the voice packets have a quality of service (QoS) associated with them) made from the UE, wherein the applicability of the mobile country code is based on a location of the device, and wherein the mobile country code relates to a country that forbids encryption of voice calls (e.g., VoLTE calls) transmitted via a mobile network (e.g., mobile network 106, which can be an LTE network). The location of the device can be based on a country identifier broadcasted by the mobile network (e.g., a broadcasted MCC). Determining whether the mobile country code stored on the device is applicable to the voice calls made from the UE can comprises determining whether the mobile country code matches the country identifier (e.g., whether the MCC stored on the device, or device's SIM card, matches the broadcasted MCC).

At block 820, the example operations 800 can comprise, in response to the determining indicating that the mobile country code is applicable to the voice calls, activating, by the UE, a Wi-Fi calling module (e.g., Wi-Fi calling client module 410) on the device to connect to an evolved packet data gateway device (e.g., ePDG 310) in the mobile network that is used for routing of voice over internet protocol packets (e.g., VoIP packets that are routed with "best effort").

The example operations 800 can further comprise receiving, by the device, an input of a dialed number associated with a call to be placed from the device. The example operations 800 can further comprise, determining, by the device, whether the dialed number relates to an emergency call. In response to the dialed number being determined not to relate the emergency call, the device can initiate the call via the Wi-Fi calling module, and transmit a voice over internet protocol packet related to the call via a cellular data connection established with the mobile network. The voice over internet protocol packet is encrypted according to an internet protocol security standard (e.g., IPSec). The voice over internet protocol packet can be transmitted via a serving gateway device (e.g., SGW 205) of the mobile network. The serving gateway device can route the voice over internet protocol packet to a packet data network gateway (e.g., PGW 210) device of the mobile network. The packet data network gateway device can route the voice over internet protocol packet to the evolved packet data gateway device (e.g., ePDG 310). The packet data gateway device can route the voice over internet protocol packet to an internet protocol multimedia subsystem core network device (e.g., IMS core 215, and more specifically, a P-CSCF device) within the mobile network.

Figure 9:
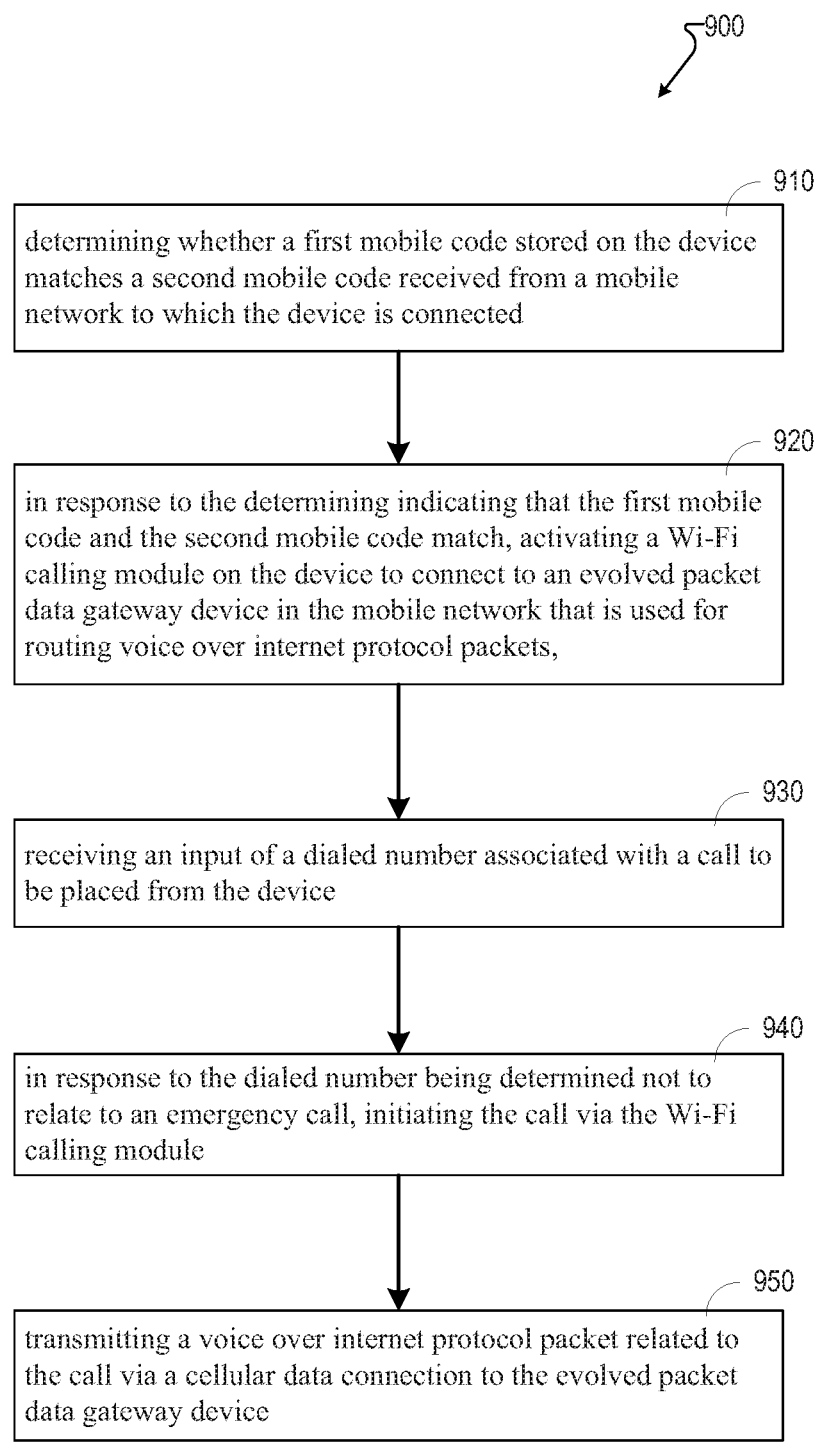
FIG. 9 illustrates another example of operations that can be performed by a user equipment, in accordance with various aspects and example embodiments of the subject disclosure.

FIG. 9 illustrates a flow diagram of example operations 900 that can be performed by a device (e.g., UE 102) comprising a processor and a memory that stores executable instructions that, when executed by the processor, facilitate performance of operations 900.

The example operations 900 at block 910 can comprise determining whether a first mobile code stored on the device matches a second mobile code received from a mobile network (e.g., mobile network 106) to which the device is connected. A match of the first mobile code (e.g., MNC stored on the device, such as repository 420 of the device or of the device's SIM card) and the second mobile code (e.g., broadcasted MNC from the mobile network) can be indicative of an absence of a roaming agreement that allows voice over long term evolution (LTE) network calls, and further indicative of a lack of a provision of roaming connections using a third-generation cellular connection (e.g., 3G connection). A match of the first mobile code (e.g., MCC stored on the device, such as repository 420 of the device or of the device's SIM card) and the second mobile code (e.g., broadcasted MCC from the mobile network) can also be indicative of the device being in a country that forbids encryption of voice calls (e.g., VoLTE calls) transmitted via the mobile network.

At block 920, the example operations 900 can further comprise, in response to the determining indicating that the first mobile code and the second mobile code match, activating a Wi-Fi calling module (e.g., Wi-Fi calling client module 410) on the device to connect to an evolved packet data gateway device in the mobile network that is used for routing voice over internet protocol packets.

The example operations 900 can further comprise, at block 930, receiving an input of a dialed number associated with a call to be placed from the device.

At block 940, the example operations 900 can comprise, in response to the dialed number being determined not to relate to an emergency call, initiating the call via the Wi-Fi calling module.

The example operations 900 can further comprise, at block 950, transmitting a voice over internet protocol packet related to the call via a cellular data connection to the evolved packet data gateway device. The voice over internet protocol packet can be encrypted according to an internet protocol security standard (e.g., IPSec). The voice over internet protocol packet can be transmitted via a serving gateway device (e.g., SGW 205) of the mobile network. The serving gateway device can route the voice over internet protocol packet to a packet data network gateway (e.g., PGW 210) device of the mobile network. The packet data network gateway device can route the voice over internet protocol packet to the evolved packet data gateway device (e.g., ePDG 310). The packet data gateway device can route the voice over internet protocol packet to an internet protocol multimedia subsystem core network device (e.g., IMS core 215, and more specifically, a P-CSCF device) within the mobile network.

Figure 10:
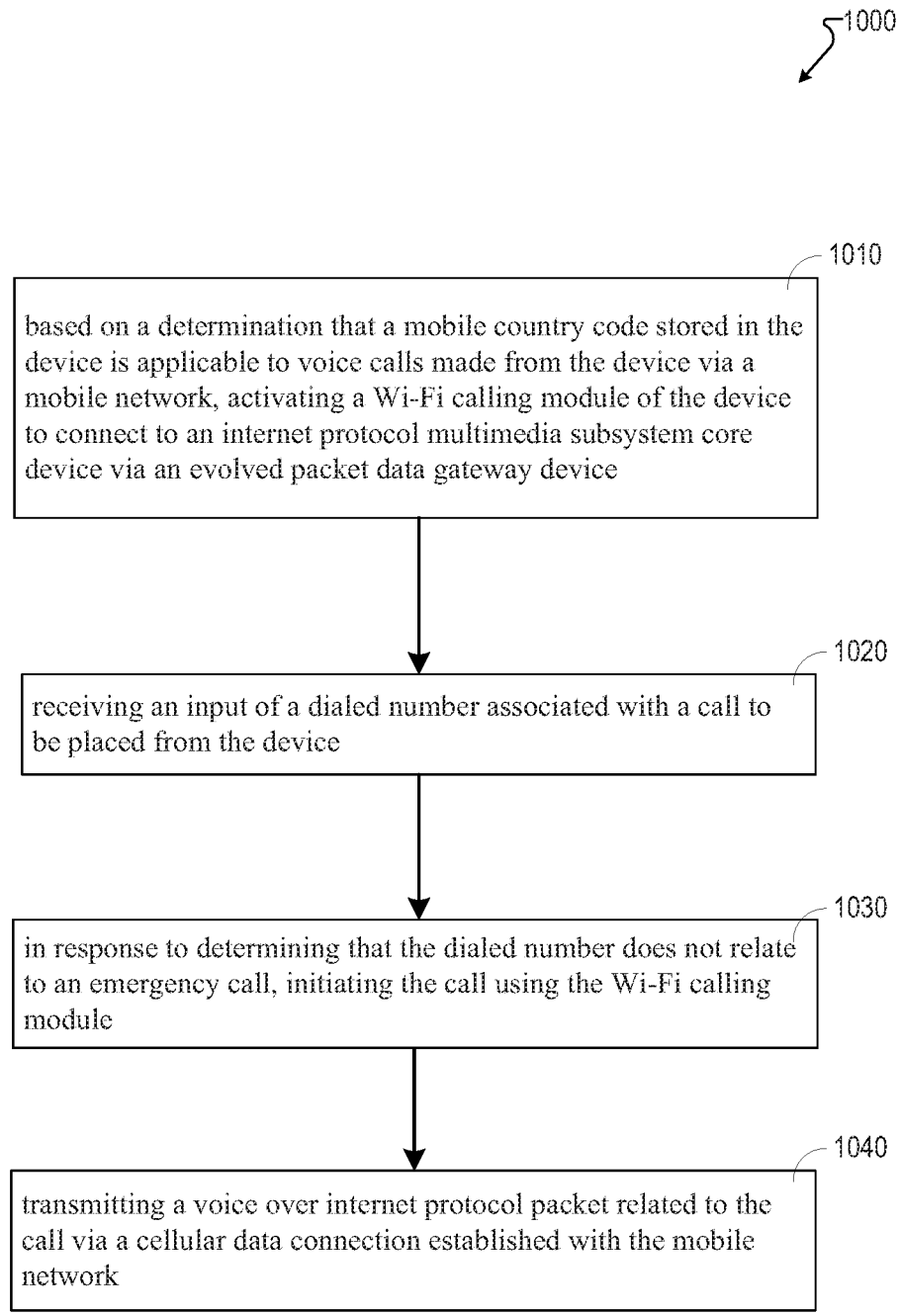
FIG. 10 illustrates another example of operations that can be performed by a user equipment, in accordance with various aspects and example embodiments of the subject disclosure.

FIG. 10 illustrates a flow diagram of example operations 1000 that can be performed by a device (e.g., UE 102) comprising a processor and a machine-readable storage medium (e.g., memory) that stores executable instructions that, when executed by the processor, facilitate performance of operations 1000.

The example operations 1000 at block 1010 can comprise, based on a determination that a mobile country code stored in the device is applicable to voice calls made from the device via a mobile network, activating a Wi-Fi calling module (e.g., Wi-Fi calling client module 410) of the device to connect to an internet protocol multimedia subsystem core device via an evolved packet data gateway device. The determination that the mobile country code is applicable to the voice calls made from the device is indicative of the device being in a country that forbids encryption of voice calls (e.g., VoLTE calls) transmitted via the mobile network. The determination that the mobile country code is applicable can be based on a match of the mobile country code with a broadcasted country indicator associated with the mobile network. As an example, a match of the first mobile code (e.g., MCC stored on the device, such as repository 420 of the device or of the device's SIM card) and the second mobile code (e.g., broadcasted MCC from the mobile network) can also be indicative of the device being in a country that forbids encryption of voice calls (e.g., VoLTE calls) transmitted via the mobile network. The mobile country code can be stored in the repository with mobile country codes associated with countries in which encryption of voice calls is against a law of the countries.

The example operations 1000 at block 1020 can comprise receiving an input of a dialed number associated with a call to be placed from the device.

At block 1030, the example operations 1000 can further comprise, in response to a determination that the dialed number does not relate to an emergency call, initiating the call using the Wi-Fi calling module.

The example operations 1000 can further comprise, transmitting a voice over internet protocol packet related to the call via a cellular data connection established with the mobile network. The cellular data connection can comprise a long term evolution connection and the mobile network can comprise a long term evolution network. The voice over internet protocol packet can be encrypted in accordance with an internet protocol security standard (e.g., IPSec). The voice over internet protocol packet can be transmitted via a serving gateway device (e.g., SGW 205) of the mobile network. The serving gateway device can route the voice over internet protocol packet to a packet data network gateway (e.g., PGW 210) device of the mobile network. The packet data network gateway device can route the voice over internet protocol packet to the evolved packet data gateway device (e.g., ePDG 310). The packet data gateway device can route the voice over internet protocol packet to an internet protocol multimedia subsystem core network device (e.g., IMS core 215, and more specifically, a P-CSCF device) within the mobile network.

Figure 11:
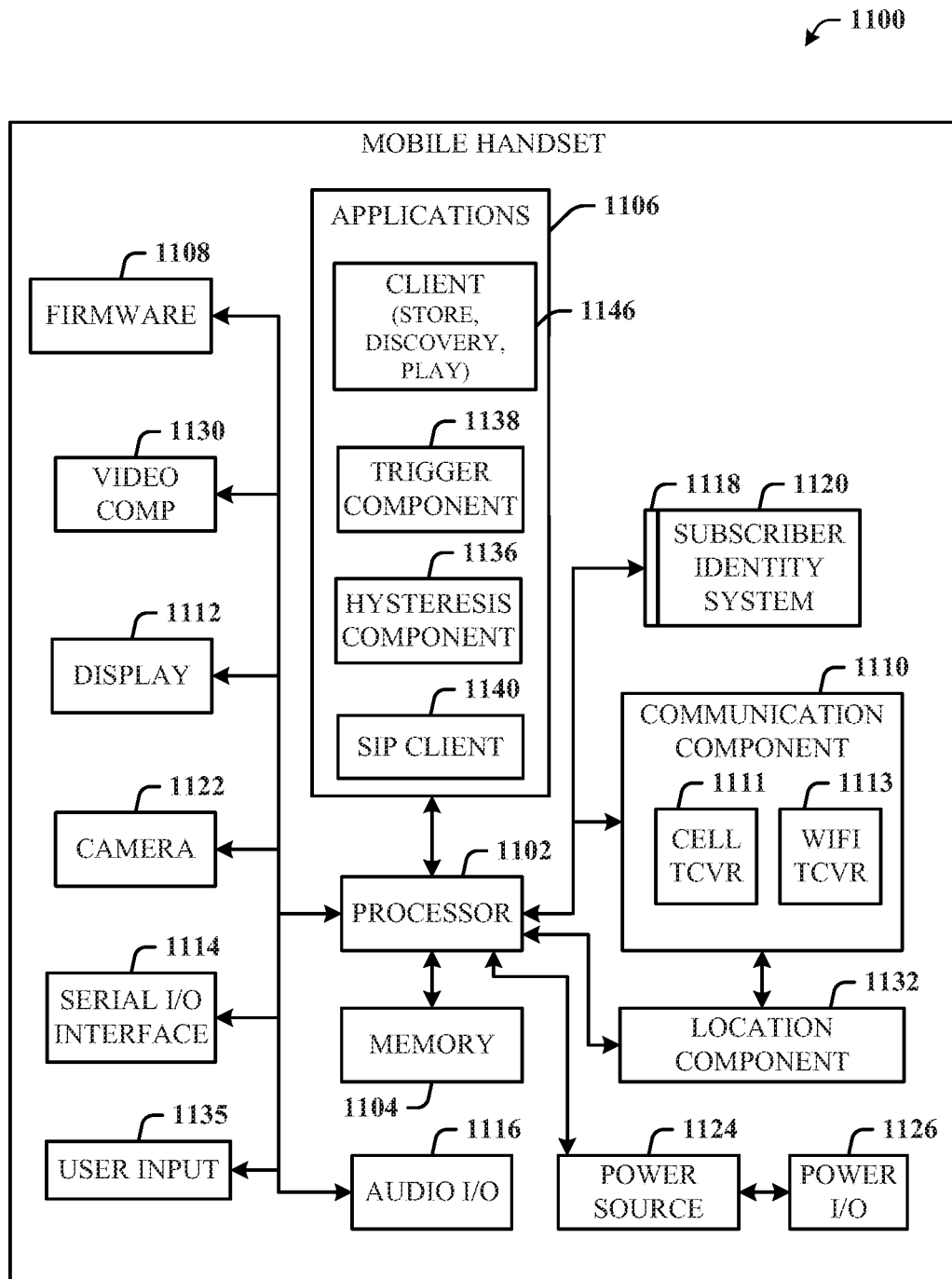
FIG. 11 illustrates a block diagram of an example mobile handset that can execute processes and methods, in accordance with various aspects and embodiments of the subject disclosure.

Referring now to FIG. 11, illustrated is a schematic block diagram of a user equipment (e.g., UE 102, etc.) that can be a mobile device (e.g., handset) 1100 capable of connecting to a network and performing the operations in accordance with some embodiments described herein. Although a mobile handset 1100 is illustrated herein, it will be understood that the mobile device can be other devices as well, and that the mobile handset 1100 is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device, including mobile handset 1100, can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The mobile handset 1100 includes a processor 1102 for controlling and processing all onboard operations and functions. A memory 1104 interfaces to the processor 1102 for storage of data and one or more applications 1106 (e.g., a video player software, user feedback component software, etc.). Other applications can include voice recognition of predetermined voice commands that facilitate initiation of the user feedback signals. The applications 1106 can be stored in the memory 1104 and/or in a firmware 1108, and executed by the processor 1102 from either or both the memory 1104 or/and the firmware 1108. The firmware 1108 can also store startup code for execution in initializing the handset 1100. A communications component 1110 interfaces to the processor 1102 to facilitate wired/wireless communication with external systems, e.g., cellular networks, VoIP networks, and so on. Here, the communications component 1110 can also include a suitable cellular transceiver 1111 (e.g., a global GSM transceiver) and/or an unlicensed transceiver 1113 (e.g., Wi-Fi, WiMax) for corresponding signal communications. The handset 1100 can be a device such as a cellular telephone, a PDA with mobile communications capabilities, and messaging-centric devices. The communications component 1110 also facilitates communications reception from terrestrial radio networks (e.g., broadcast), digital satellite radio networks, and Internet-based radio services networks.

The mobile handset 1100 can include a display 1112 for displaying text, images, video, telephony functions (e.g., a Caller ID function), setup functions, and for user input. For example, the display 1112 can also be referred to as a "screen" that can accommodate the presentation of multimedia content (e.g., music metadata, messages, wallpaper, graphics, etc.). The display 1112 can also display videos and can facilitate the generation, editing and sharing of video quotes. A serial I/O interface 1114 is provided in communication with the processor 1102 to facilitate wired and/or wireless serial communications (e.g., USB, and/or IEEE 1394) through a hardwire connection, and other serial input devices (e.g., a keyboard, keypad, and mouse). This supports updating and troubleshooting the handset 1100, for example. Audio capabilities are provided with an audio I/O component 1116, which can include a speaker for the output of audio signals related to, for example, indication that the user pressed the proper key or key combination to initiate the user feedback signal. The audio I/O component 1116 also facilitates the input of audio signals through a microphone to record data and/or telephony voice data, and for inputting voice signals for telephone conversations.

The handset 1100 can include a slot interface 1118 for accommodating a SIC (Subscriber Identity Component) in the form factor of a Subscriber Identity Module (SIM) card 1120 (or universal SIM card 1120), and interfacing the SIM card 1120 with the processor 1102. However, it is to be appreciated that the SIM card 1120 can be manufactured into the handset 1100, and updated by downloading data and software.

The handset 1100 can process IP data traffic through the communications component 1110 to accommodate IP traffic from an IP network such as, for example, the Internet, a corporate intranet, a home network, a person area network, etc., through an ISP or broadband cable provider. Thus, VoIP traffic can be utilized by the handset 1100 and IP-based multimedia content can be received in either an encoded or decoded format.

A video processing component 1122 (e.g., a camera) can be provided for decoding encoded multimedia content. The video processing component 1122 can aid in facilitating the generation, editing and sharing of video quotes. The handset 1100 also includes a power source 1124 in the form of batteries and/or an AC power subsystem, which power source 1124 can interface to an external power system or charging equipment (not shown) by a power I/O component 1126.

The handset 1100 can also include a video component 1130 for processing video content received and, for recording and transmitting video content. For example, the video component 1130 can facilitate the generation, editing and sharing of video quotes. A location tracking component 1132 facilitates geographically locating the handset 1100. As described hereinabove, this can occur when the user initiates the feedback signal automatically or manually. A user input component 1134 facilitates the user initiating the quality feedback signal. The user input component 1134 can also facilitate the generation, editing and sharing of video quotes. The user input component 1134 can include such conventional input device technologies such as a keypad, keyboard, mouse, stylus pen, and/or touch screen, for example.

Referring again to the applications 1106, a hysteresis component 1136 facilitates the analysis and processing of hysteresis data, which is utilized to determine when to associate with the access point. A software trigger component 1138 can be provided that facilitates triggering of the hysteresis component 1138 when the Wi-Fi transceiver 1113 detects the beacon of the access point. A SIP client 1140 enables the handset 1100 to support SIP protocols and register the subscriber with the SIP registrar server. The applications 1106 can also include a client 1142 that provides at least the capability of discovery, play and store of multimedia content, for example, music.

The handset 1100, as indicated above related to the communications component 1110, includes an indoor network radio transceiver 1113 (e.g., Wi-Fi transceiver 1113). This function supports the indoor radio link, such as IEEE 802.11, for the handset 1100. The handset 1100 can accommodate at least satellite radio services through a handset that can combine wireless voice and digital radio chipsets into a single handheld device.

Figure 12:
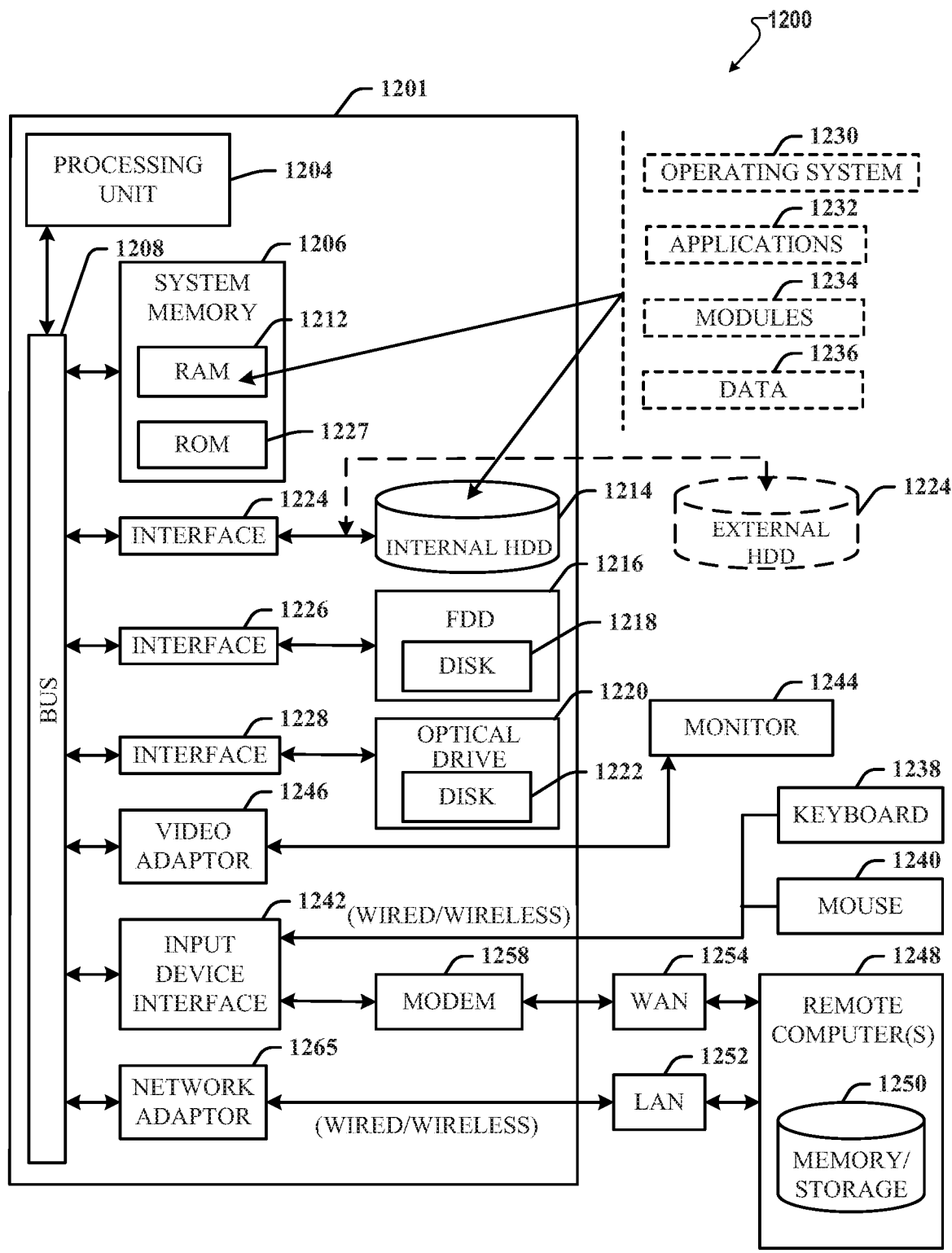
FIG. 12 illustrates a block diagram of an example computer that can execute processes and methods, in accordance with various aspects and embodiments of the subject disclosure.

Referring now to FIG. 12, there is illustrated a block diagram of a computer 1200 operable to execute the functions and operations performed in the described example embodiments. For example, a PGW (e.g., SGW 205 and PGW 210) can contain components as described in FIG. 12. The computer 1200 can provide networking and communication capabilities between a wired or wireless communication network and a server and/or communication device. In order to provide additional context for various aspects thereof, FIG. 12 and the following discussion are intended to provide a brief, general description of a suitable computing environment in which the various aspects of the embodiments can be implemented to facilitate the functions and operations described herein. While the description above is in the general context of computer-executable instructions that can run on one or more computers, those skilled in the art will recognize that the embodiments also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the embodiments can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 12, implementing various aspects described herein, devices can include a computer 1200, the computer 1200 comprising a processing unit 1204, a system memory 1206 and a system bus 1208. The system bus 1208 couples system components comprising the system memory 1206 to the processing unit 1204. The processing unit 1204 can be any of various commercially available processors. Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 comprises read-only memory (ROM) 1227 and random access memory (RAM) 1212. A basic input/output system (BIOS) is stored in a non-volatile memory 1227 such as ROM, EPROM, EEPROM, which BIOS contains the basic routines that help to transfer information between elements within the computer 1200, such as during start-up. The RAM 1212 can also include a high-speed RAM such as static RAM for caching data.

The computer 1200 further comprises an internal hard disk drive (HDD) 1214 (e.g., EIDE, SATA), which internal hard disk drive 1214 can also be configured for external use in a suitable chassis (not shown), a magnetic floppy disk drive (FDD) 1216, (e.g., to read from or write to a removable diskette 1218) and an optical disk drive 1220, (e.g., reading a CD-ROM disk 1222 or, to read from or write to other high capacity optical media such as the DVD). The hard disk drive 1214, magnetic disk drive 1216 and optical disk drive 1220 can be connected to the system bus 1208 by a hard disk drive interface 1224, a magnetic disk drive interface 1226 and an optical drive interface 1228, respectively. The interface 1224 for external drive implementations comprises at least one or both of Universal Serial Bus (USB) and IEEE 1294 interface technologies. Other external drive connection technologies are within contemplation of the subject embodiments.

The drives and their associated computer-readable media provide nonvolatile storage of data, data structures, computer-executable instructions, and so forth. For the computer 1200 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1200, such as zip drives, magnetic cassettes, flash memory cards, cartridges, and the like, can also be used in the example operating environment, and further, that any such media can contain computer-executable instructions for performing the methods of the disclosed embodiments.

A number of program modules can be stored in the drives and RAM 1212, comprising an operating system 1230, one or more application programs 1232, other program modules 1234 and program data 1236. All or portions of the operating system, applications, modules, and/or data can also be cached in the RAM 1212. It is to be appreciated that the embodiments can be implemented with various commercially available operating systems or combinations of operating systems.

A user can enter commands and information into the computer 1200 through one or more wired/wireless input devices, e.g., a keyboard 1238 and a pointing device, such as a mouse 1240. Other input devices (not shown) can include a microphone, an IR remote control, a joystick, a game pad, a stylus pen, touch screen, or the like. These and other input devices are often connected to the processing unit 1204 through an input device interface 1242 that is coupled to the system bus 1208, but can be connected by other interfaces, such as a parallel port, an IEEE 2394 serial port, a game port, a USB port, an IR interface, etc.

A monitor 1244 or other type of display device is also connected to the system bus 1208 through an interface, such as a video adapter 1246. In addition to the monitor 1244, a computer 1200 typically comprises other peripheral output devices (not shown), such as speakers, printers, etc.

The computer 1200 can operate in a networked environment using logical connections by wired and/or wireless communications to one or more remote computers, such as a remote computer(s) 1248. The remote computer(s) 1248 can be a workstation, a server computer, a router, a personal computer, portable computer, microprocessor-based entertainment device, a peer device or other common network node, and typically comprises many, if not all of, the elements described relative to the computer, although, for purposes of brevity, only a memory/storage device 1250 is illustrated. The logical connections depicted include wired/wireless connectivity to a local area network (LAN) 1252 and/or larger networks, e.g., a wide area network (WAN) 1254. Such LAN and WAN networking environments are commonplace in offices and companies, and facilitate enterprise-wide computer networks, such as intranets, all of which can connect to a global communications network, e.g., the Internet.

When used in a LAN networking environment, the computer 1200 is connected to the local network 1252 through a wired and/or wireless communication network interface or adapter 1256. The adapter 1256 can facilitate wired or wireless communication to the LAN 1252, which can also include a wireless access point disposed thereon for communicating with the wireless adapter 1256.

When used in a WAN networking environment, the computer 1200 can include a modem 1258, or is connected to a communications server on the WAN 1254, or has other means for establishing communications over the WAN 1254, such as by way of the Internet. The modem 1258, which can be internal or external and a wired or wireless device, is connected to the system bus 1208 through the input device interface 1242. In a networked environment, program modules depicted relative to the computer, or portions thereof, can be stored in the remote memory/storage device 1250. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This comprises at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 5 GHz radio bands, at an 11 Mbps (802.11b) or 54 Mbps (802.11a) data rate, for example, or with products that contain both bands (dual band), so the networks can provide real-world performance similar to the basic "10BaseT" wired Ethernet networks used in many offices.

As used in this application, the terms "system," "component," "interface," and the like are generally intended to refer to a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. These components also can execute from various computer readable storage media comprising various data structures stored thereon. The components can communicate via local and/or remote processes such as in accordance with a signal comprising one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry that is operated by software or firmware application(s) executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. An interface can comprise input/output (I/O) components as well as associated processor, application, and/or API components.

Furthermore, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As it employed in the subject specification, the term "processor" can refer to substantially any computing processing unit or device comprising single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of UE. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory. In addition, memory components or memory elements can be removable or stationary. Moreover, memory can be internal or external to a device or component, or removable or stationary. Memory can comprise various types of media that are readable by a computer, such as hard-disc drives, zip drives, magnetic cassettes, flash memory cards or other types of memory cards, cartridges, or the like.

By way of illustration, and not limitation, nonvolatile memory can comprise read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

In particular and in regard to the various functions performed by the above described components, devices, circuits, systems and the like, the terms (comprising a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated example aspects of the embodiments. In this regard, it will also be recognized that the embodiments comprises a system as well as a computer-readable medium comprising computer-executable instructions for performing the acts and/or events of the various methods.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communications media comprise wired media, such as a wired network or direct-wired connection, and wireless media such as acoustic, RF, infrared and other wireless media Further, terms like "user equipment," "user device," "mobile device," "mobile," station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary," where used, is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature can be combined with one or more other features of the other implementations as may be desired and advantageous for any given or particular application. Furthermore, to the extent that the terms "have", "having", "includes" and "including" and variants thereof are used in either the detailed description or the claims, these terms are intended to be inclusive in a manner similar to the term "comprising."

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art can recognize that other embodiments comprising modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the claims below.

What is claimed is:

1. A method, comprising:
   receiving, by a device comprising a processor via a network, a broadcast mobile code from network equipment, wherein the broadcast mobile code references a country that has forbidden encryption of a voice call;
   in response to the broadcast mobile code being determined to match a provisioned mobile code comprising a mobile country code that is associated with the country,
     determining, by the device, that there is a lack of a provisioning of roaming connections using a cellular connection adhering to a third-generation network communication protocol, and
     determining, by the device, that there is an absence of a roaming agreement that allows voice over long term evolution network calls, wherein the provisioned mobile code has been stored on a memory usable by the device; and
   based on the lack of the provisioning, and the absence of the roaming agreement, activating, by the device, a Wi-Fi calling module usable by the device to connect to an evolved packet data gateway device that facilitates routing of voice over internet protocol packets via the network.

2. The method of claim 1, further comprising:
   determining, by the device, whether the provisioned mobile code is applicable, based on a location of the device, to voice calls made from the device.

3. The method of claim 2, wherein the location of the device is based on a country identifier that has been broadcasted by the network equipment.

4. The method of claim 3, wherein the broadcast mobile code comprises the country identifier.

5. The method of claim 1, further comprising;
   in response to receiving an input of a dialed number associated with a call to be placed from the device, transmitting, by the device, a voice over internet protocol packet related to the call via a cellular data connection.

6. The method of claim 5, wherein transmitting the voice over internet protocol packet via the cellular data connection comprises transmitting the voice over internet protocol packet via a serving gateway device.

7. The method of claim 6, wherein the serving gateway device routes the voice over internet protocol packet to a packet data network gateway device.

8. The method of claim 7, wherein the packet data network gateway device routes the voice over internet protocol packet to the evolved packet data gateway device.

9. The method of claim 7, wherein the evolved packet data gateway device routes the voice over internet protocol packet to an internet protocol multimedia subsystem core network device.

10. The method of claim 1, wherein the voice over internet protocol packet is encrypted according to an internet protocol security standard.

11. The method of claim 1, wherein the voice call comprises a voice over long term evolution call, and wherein the network comprises a long term evolution network.

12. A device, comprising:
a processor; and
a memory that stores executable instructions that, when executed by the processor, facilitate performance of operations, comprising:
determining whether a first mobile code stored on the device is equivalent to a second mobile code that has been received from a server system via a network;
in response to the first mobile code and the second mobile code being determined to be equivalent, determining that there is a lack of a provision of roaming connections using a third-generation cellular connection, and further determining that there is an absence of a roaming agreement that allows voice over long term evolution network calls; and
based on the lack of the provision of the roaming connections and the absence of the roaming agreement, activating a Wi-Fi calling module on the device to facilitate connection to an evolved packet data gateway device via the network, wherein the evolved packet data gateway device facilitates routing of voice over internet protocol packets.

13. The device of claim 12, wherein the second mobile code references a country that forbids encryption of voice calls transmitted via the network.

14. The device of claim 12, wherein the operations further comprise:
receiving an input of a dialed number associated with a call to be placed from the device; and
transmitting, by the device via a cellular data connection, a voice over internet protocol packet related to the call to the evolved packet data gateway device, wherein the voice over internet protocol packet is encrypted according to an internet protocol security standard.

15. A non-transitory machine-readable medium, comprising executable instructions that, when executed by a device comprising a processor, facilitate performance of operations, comprising:
in response to a first mobile code that has been stored by the device being determined to match a second mobile code that has been received from network equipment via a network, determining that there is a lack of a provision of roaming connections using a cellular connection implemented according to a third-generation network protocol, and further determining there is an absence of a roaming agreement that allows voice over long term evolution network calls; and
in response to the determining of the lack of the provision of the roaming connections, and in response to the determining of the absence of the roaming agreement, activating a Wi-Fi calling module by the device to connect to an evolved packet data gateway device that is used for routing voice over internet protocol packets via the network.

16. The non-transitory machine-readable medium of claim 15, wherein the second mobile code is indicative of the device being in a country that forbids encryption of voice calls transmitted via the network equipment.

17. The non-transitory machine-readable medium of claim 15, wherein the operations further comprise:
receiving an input of a dialed number associated with a call to be placed from the device; and
in response to determining that the dialed number does not relate to an emergency call, initiating the call using the Wi-Fi calling module.

18. The non-transitory machine-readable medium of claim 17, wherein the operations further comprise:
transmitting a voice over internet protocol packet related to the call via a cellular data connection of the network equipment.

19. The non-transitory machine-readable medium of claim 18, wherein the cellular data connection comprises a long term evolution connection, and wherein the network comprises a long term evolution network.

20. The non-transitory machine-readable medium of claim 18, wherein the voice over internet protocol packet is encrypted in accordance with an internet protocol security standard.

* * * * *